(12) United States Patent
Yamada et al.

(10) Patent No.: US 8,985,673 B2
(45) Date of Patent: Mar. 24, 2015

(54) VEHICLE DOOR FRAME STRUCTURE

(71) Applicant: Shiroki Corporation, Kanagawa (JP)

(72) Inventors: Makoto Yamada, Kanagawa (JP); Jun Makita, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 0 days.

(21) Appl. No.: 14/172,967

(22) Filed: Feb. 5, 2014

(65) Prior Publication Data
US 2014/0217772 A1     Aug. 7, 2014

(30) Foreign Application Priority Data
Feb. 5, 2013   (JP) .................................. 2013-20157

(51) Int. Cl.
*B60J 5/04*     (2006.01)
(52) U.S. Cl.
CPC .............. *B60J 5/0402* (2013.01); *B60J 5/0401* (2013.01)
USPC .................................................... 296/146.5
(58) Field of Classification Search
CPC .......... B60J 5/04; B60J 5/0401; B60J 5/0402; B60J 5/0406; B60J 5/0408; B60J 5/0463
USPC ............................... 296/146.5, 146.6; 49/502
See application file for complete search history.

(56) References Cited

U.S. PATENT DOCUMENTS

| | | | |
|---|---|---|---|
| 5,046,778 A * | 9/1991 | Larsen ........................... | 296/202 |
| 5,735,081 A * | 4/1998 | Yamanaka et al. .............. | 49/506 |
| 7,891,137 B2 * | 2/2011 | Takeuchi et al. ................ | 49/502 |
| 8,317,253 B2 * | 11/2012 | Sachdev et al. ............ | 296/146.5 |
| 2004/0123526 A1 * | 7/2004 | Hock et al. ....................... | 49/502 |
| 2006/0181107 A1 * | 8/2006 | Nishikawa ................. | 296/146.2 |
| 2009/0115220 A1 * | 5/2009 | Takeuchi et al. ........... | 296/146.6 |
| 2014/0021739 A1 * | 1/2014 | Shimizu et al. ............ | 296/146.5 |
| 2014/0062122 A1 * | 3/2014 | Katayama .................. | 296/146.2 |
| 2014/0132028 A1 * | 5/2014 | Yamada et al. ............ | 296/146.2 |
| 2014/0217772 A1 * | 8/2014 | Yamada et al. ............ | 296/146.5 |
| 2014/0284961 A1 * | 9/2014 | Otake et al. ................ | 296/146.6 |

FOREIGN PATENT DOCUMENTS

| | | | | |
|---|---|---|---|---|
| JP | 2007-137200 | * | 6/2007 | ................. B60J 5/04 |
| JP | 2007137200 | | 6/2007 | |
| JP | 2008-230449 | * | 10/2008 | ................. B60J 5/04 |
| JP | 2012-6536 | * | 1/2012 | ................. B06J 5/04 |

OTHER PUBLICATIONS

Shiroki Corp., "Support structure of glass," Patent Abstracts of Japan, Publication Date: Jun. 7, 2007; English Abstract of JP-2007137200.

* cited by examiner

*Primary Examiner* — Gregory Blankenship
(74) *Attorney, Agent, or Firm* — Millen, White, Zelano & Branigan, P.C.

(57) ABSTRACT

A door frame structure of a vehicle door includes an upright pillar sash and an upper sash that are joined together at a corner portion. An opening is formed in a tubular enclosed frame body portion of one of the upright pillar sash and the upper sash, at the corner portion, into which a tubular enclosed frame body portion of the other of the upright pillar sash and the upper sash is inserted. A longitudinal-end surface of the other of the upright pillar sash and the upper sash is brought against an inner surface of the frame body portion of the one of the upright pillar sash and the upper sash. An insertion part of the other of the upright pillar sash and the upper sash is fixed and welded to the one of the upright pillar sash and the upper sash.

6 Claims, 7 Drawing Sheets

VEHICLE DOOR FRAME STRUCTURE

BACKGROUND OF THE INVENTION

1. Field of the Invention

The present invention relates to a vehicle door frame structure, and in particular relates to a joining structure between an upright pillar sash extending in the vertical direction of the door and an upper sash, which forms the upper edge of the door.

2. Description of Related Art

A vehicle door frame in which mutually opposed longitudinal-end surfaces of an upright pillar sash, extending in the vertical direction of a door, and an upper sash, which forms the upper edge of the door, are butted and joined together by welding in the door corner portion is known in the art. The butting and joining of the mutually opposed longitudinal-end surfaces requires a high-precision manufacturing process of the parts so as to have a low tolerance in each profile (shape) of the mutually opposed longitudinal-end surfaces, and hence, it is difficult to achieve a favorable joining strength therebetween.

Japanese Unexamined Patent Publication No. 2007-137200 discloses a door corner structure in which the end-surface of an upper sash butts against an upright pillar sash while part of the upper sash is inserted inside the upright pillar sash to overlap therewith. Due to the insertion portion of upper sash that is inserted into the upright pillar sash, ease of positioning and improvements in the joining strength, to a certain extent, can be anticipated with this joining structure; however, an improved door frame structure is desired with respect to the strength and precision of the door corner portion.

SUMMARY OF THE INVENTION

The present invention provides a vehicle door frame structure of a door frame in which an upright pillar sash and an upper sash are joined at a corner portion, having a superior joining strength at the corner portion and in which the precision thereof can be easily controlled.

The present invention is characterized by a door frame structure of a vehicle door, including an upright pillar sash that extends in a substantially vertical direction and an upper sash that forms an upper edge of the vehicle door, wherein the upright pillar sash and the upper sash are joined together at a corner portion. Each of the upright pillar sash and the upper sash includes a frame body portion extending in a longitudinal direction thereof, the frame body portion including a vehicle-inner-side wall section and a vehicle-outer-side wall section which are separate from each other in a direction toward the vehicle inner side/vehicle outer side, and an inner-peripheral-side wall section and an outer-peripheral-side wall section which connect the vehicle-inner-side wall section and the vehicle-outer-side wall section to each other and are separate from each other in a direction toward the inner peripheral side/outer peripheral side of the door frame, wherein the vehicle-inner-side wall section, the inner-peripheral-side wall section, the vehicle-outer-side wall section and the outer-peripheral-side wall section form a tubular enclosed cross-sectional shape. An opening is formed in part of the frame body portion of one of the upright pillar sash and the upper sash at the corner portion, and the frame body portion of the other of the upright pillar sash and the upper sash is inserted into the frame body portion, of the one of the upright pillar sash and the upper sash, through the opening thereof. A longitudinal-end surface of the other of the upright pillar sash and the upper sash that is inserted into the opening is brought against an inner surface of the frame body portion that extends in the longitudinal direction of the one of the upright pillar sash and the upper sash in which the opening is formed. At least part of an insertion part of the other of the upright pillar sash and the upper sash that is inserted into the opening is fixed and welded to the one of the upright pillar sash and the upper sash.

At the corner portion, part of the inner-peripheral-side wall section of the frame body portion of the one of the upright pillar sash can be cut out to form the opening, and a longitudinal-end surface of the frame body portion of the other of the upright pillar sash and the upper sash can be inserted until being brought against an inner surface of the outer-peripheral-side wall section of the frame body portion of the one of the upright pillar sash and the upper sash. A region along the vehicle-outer-side wall section of the longitudinal-end surface of the other of the upright pillar sash and the upper sash is brought against and is welded to the outer-peripheral-side wall section of the one of the upright pillar sash and the upper sash.

Furthermore, at the corner portion, a region along the opening of the inner-peripheral-side wall section of the one of the upright pillar sash and the upper sash is brought against and welded to the inner-peripheral-side wall section of the other of the upright pillar sash and the upper sash.

Furthermore, at the corner portion, the vehicle-inner-side wall section of the other of the upright pillar sash and the upper sash and the vehicle-inner-side wall section of the one of the upright pillar sash and the upper sash can be mutually overlapped and be welded to each other at overlapping regions thereof.

Each of the one and the other of the upright pillar sash and the upper sash can include an extension section which extends from an associated the frame body portion toward the vehicle outer side, and wherein a region along the extension section of the longitudinal-end surface of the other of the upright pillar sash and the upper sash is welded to the extension section of the one of the upright pillar sash and the upper sash.

According to the present invention, since a frame body portion of the inserting sash of one of the upright pillar sash and the upper sash is inserted into the frame body portion of the insertion-receiving sash of the other of the upright pillar sash and the upper sash until the longitudinal-end surface of the inserting sash is positioned against the inner surface of the frame body portion of the insertion-receiving sash that extends in the longitudinal direction thereof, and at least part of the insertion portion is welded, the precision of the upper sash and the upright pillar sash at the corner portion can be easily controlled, and the joining strength at the corner portion can be improved.

The present disclosure relates to subject matter contained in Japanese Patent Application No. 2013-20157 (filed on Feb. 5, 2013) which is expressly incorporated herein by reference in its entirety.

BRIEF DESCRIPTION OF THE DRAWINGS

The present invention will be discussed below in detail with reference to the accompanying drawings, in which.

DESCRIPTION OF THE EMBODIMENTS

Figure 1:
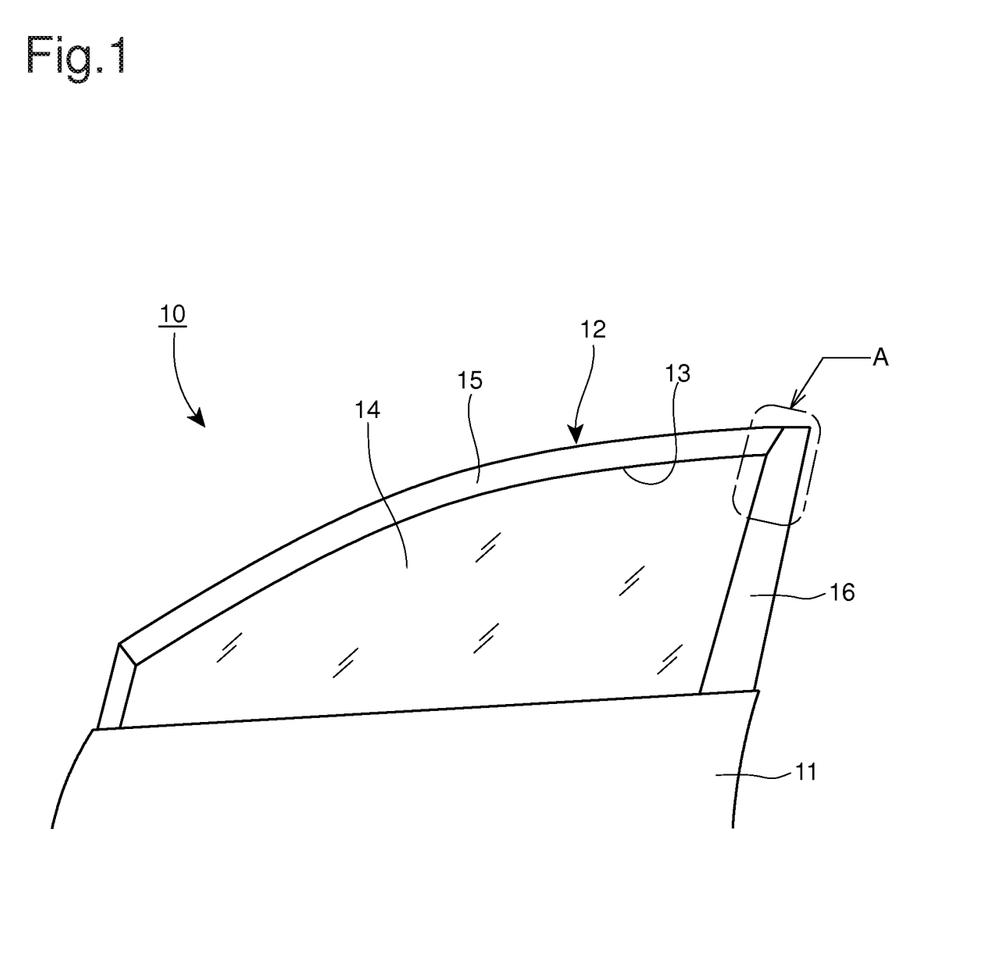
FIG. 1 is side elevational view of a motor-vehicle side door for use as a front-seat door, to which a vehicle door frame structure according to the present invention has been applied, viewed from the vehicle interior side.

A front door (hereinafter, a door) 10, of a motor vehicle, shown in FIG. 1 is provided with a door panel 11 and a door frame 12, formed in the shape of a frame, on the upper side of the door panel 11. A door glass 14 is provided in, and is moved upwardly and downwardly inside, a window opening 13, which is defined by the upper edge of the door panel 11 and the inner peripheral edge of the door frame 12. A glass run (not shown) formed from an elastic material is provided in the inner periphery of the door frame 12 that faces toward the window opening 13, so that the edge of the door glass 14 is held by the glass run.

The door frame 12 is provided with an upper sash (insertion sash) 15 that defines the upper edge portion of the door 10, and an upright pillar sash (insertion-receiving sash) 16 which extends upwardly from a rear part of the door panel 11; the rear end of the upper sash 15 and the upper end of the upright pillar sash 16 are joined together at a door corner portion A. When the door 10 is closed, the upper sash 15 is positioned along a door-opening portion of a roof panel of the vehicle body (not shown) and the upright pillar sash 16 is positioned along a central pillar of the vehicle body. A weather strip (not shown) formed from an elastic material is provided on the outer peripheries of the upper sash 15 and the upright pillar sash 16. When the door 10 is closed, the weather strip elastically deforms to close the gap between the door 10 and the vehicle body in a liquid-tight manner.

In the following descriptions, a side of the door frame 12 facing the window opening 13 is referred to as the inner peripheral side, and the other side of the door frame 12 that faces the vehicle body opening is referred to as the outer peripheral side. In addition, terms indicating a direction such as the "front", "rear", "up", "down", "vehicle inner side" and "vehicle outer side", will be mentioned in the following descriptions to designate directions determined with reference to the vehicle body, to which the door 10 that is for use as a front-seat door is attached.

Figure 6:
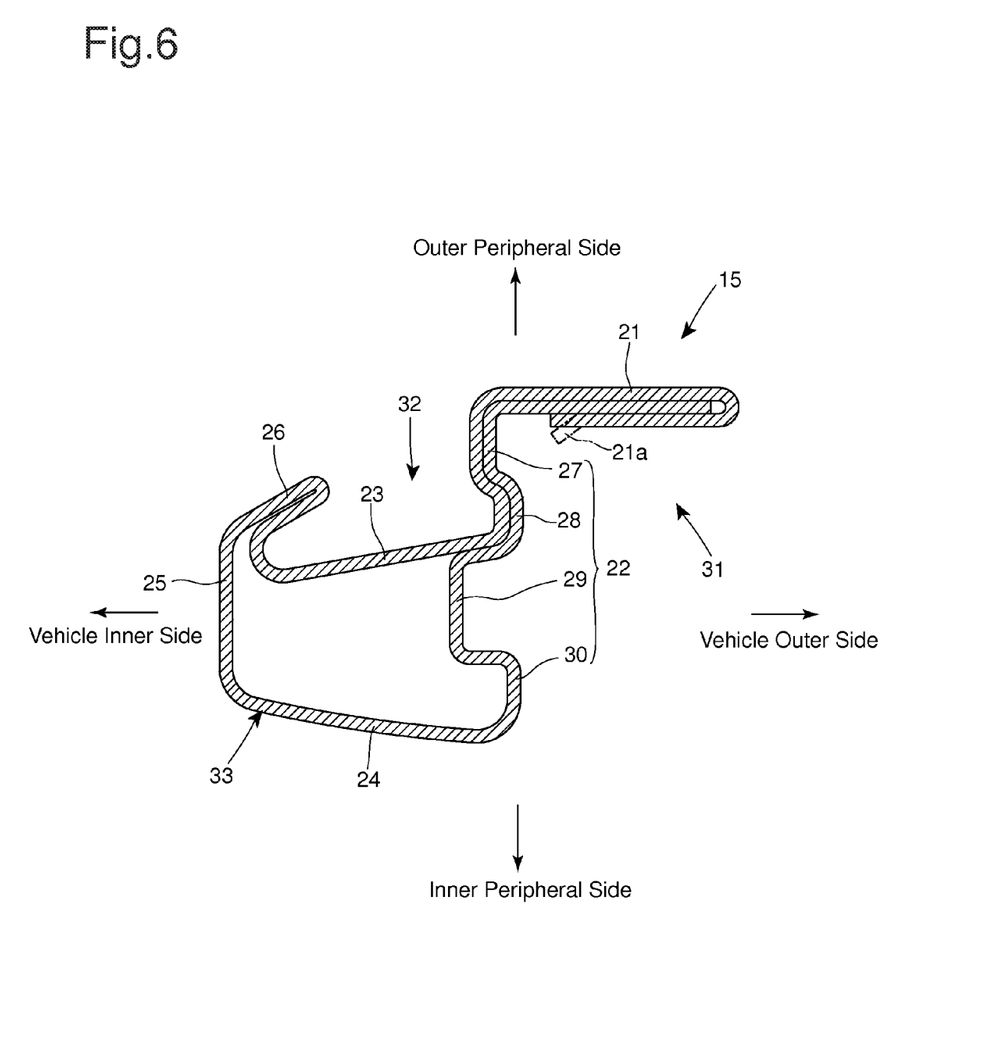
FIG. 6 is a sectional view of the upper sash, taken along the line VI-VI shown in FIG. 2.

As shown in FIG. 6, the upper sash 15 is provided with a glass-run retainer base wall (extension section) 21, a central wall (vehicle-outer-side wall section) 22 which extends toward the inner peripheral side from the vehicle-inner-side end of the glass-run retainer base wall 21, a weather-strip retaining base wall (outer-peripheral-side wall section) 23 and an inner peripheral wall (inner-peripheral-side wall section) 24 which extend from the central wall 22 toward the vehicle inner side, a vehicle-inner-side wall (vehicle-inner-side wall section) 25 which connects the weather-strip retaining base wall 23 with the inner peripheral wall 24, and a cantilever protrusion 26 which protrudes toward the outer peripheral side from the boundary between weather-strip retaining base wall 23 and the vehicle-inner-side wall 25 and bends toward the vehicle outer side. The central wall 22 has a rippled profile, including a first stepped section 27 projecting toward the vehicle inner side, a second stepped section 28 projecting toward the vehicle outer side, a third stepped section 29 projecting toward the vehicle inner side, and a fourth stepped section 30 projecting toward the vehicle outer side, in that order from the outer peripheral side to the inner peripheral side. The upper sash 15 is an elongated member made of sheet metal which is formed by extrusion or roll forming, and the sheet metal is overlapped at the first stepped section 27 and the second stepped section 28 to form two sheet metal layers thereat. The glass-run retainer base wall 21 is further provided with a folded-back section that folds back toward the inner peripheral side over a section that is continuous from the first stepped section 27 to thereby form a three-layered structure thereat.

In the upper sash 15, the section defined by the glass-run retainer base wall 21 and the central wall 22 defines a glass-run retainer portion 31 in which a glass run is fitted and retained. Although not shown in the drawings, the glass run that is fitted and retained in the glass-run retainer portion 31 has a bottomed boxed shape having a base section along the glass-run retainer base wall 21, a vehicle-inner-side wall section along the central wall 22, and a vehicle-outer-side wall section positioned on the vehicle outer side and facing the vehicle-inner-side wall section. The vehicle-outer-side wall section of the glass run forms a design portion of the upper sash 15. The glass run is retained by engaging with each stepped section 27, 28, 29 and 30, which form the central wall 22. Furthermore, in a general cross-sectional part of the upper sash 15, except for the corner portion A, an engaging section 21a, which projects toward the inner peripheral side, is formed on the glass-run retainer base wall 21, as shown by two-dot chain lines in FIG. 6; the glass run is also engaged with this engaging section 21a.

Furthermore, a structure is known in the art in which an upper edge portion of a division bar, for isolating the door glass, is inserted into the glass-run retainer portion of the upper sash in a type of door that is provided with such a division bar in the inner side of the door frame thereof. Although a division bar is not provided n the door 10 of the illustrated embodiment, in the case where the present invention is applied to a type of door that is provided with a division bar, since if the engaging section 21a is formed in the glass-run retainer portion 31 of the upper sash 15, as shown in FIG. 6, the engaging section 21a would interfere with the upper edge portion of the division bar, the engaging section 21a can be cut (in the same manner as the corner portion A) or flattened so as not to protrude at the insertion location of the division bar. Alternatively, interference of the upper edge portion of the division bar can be avoided by cutting out the sheet-metal layer, of the three-layered metal structure of the glass-run retainer base wall 21, that is closest to the inner peripheral side and provided with the engaging section 21a.

The central wall 22 (mainly the first stepped section 27 and the second stepped section 28), the weather-strip retaining base wall 23, the upper portion of the vehicle-inner-side wall 25 and the cantilever protrusion 26 of the upper sash 15 define a weather-strip retaining portion 32 for fitting and retaining a weather strip therein. The weather-strip retaining portion 32 has a bottomed box shape which is open at the outer peripheral side, and the weather strip is prevented from coming off the weather-strip retaining portion 32 by the cantilever protrusion 26 and the second stepped section 28 (the boundary between the first stepped section 27 and the second stepped section 28).

The central wall 22 (mainly the third stepped section 29 and the fourth stepped section 30), the weather-strip retaining base wall 23, the inner peripheral wall 24 and the vehicle-inner-side wall 25 of the upper sash 15 define a rectangular-tubular (rectangular hollow-section) main frame portion (frame body portion) 33 having a hollow section. The main frame portion 33 has a closed cross-sectional shape over the entire longitudinal length of the upper sash 15, and increases the sectional strength of the upper sash 15.

Figure 5:
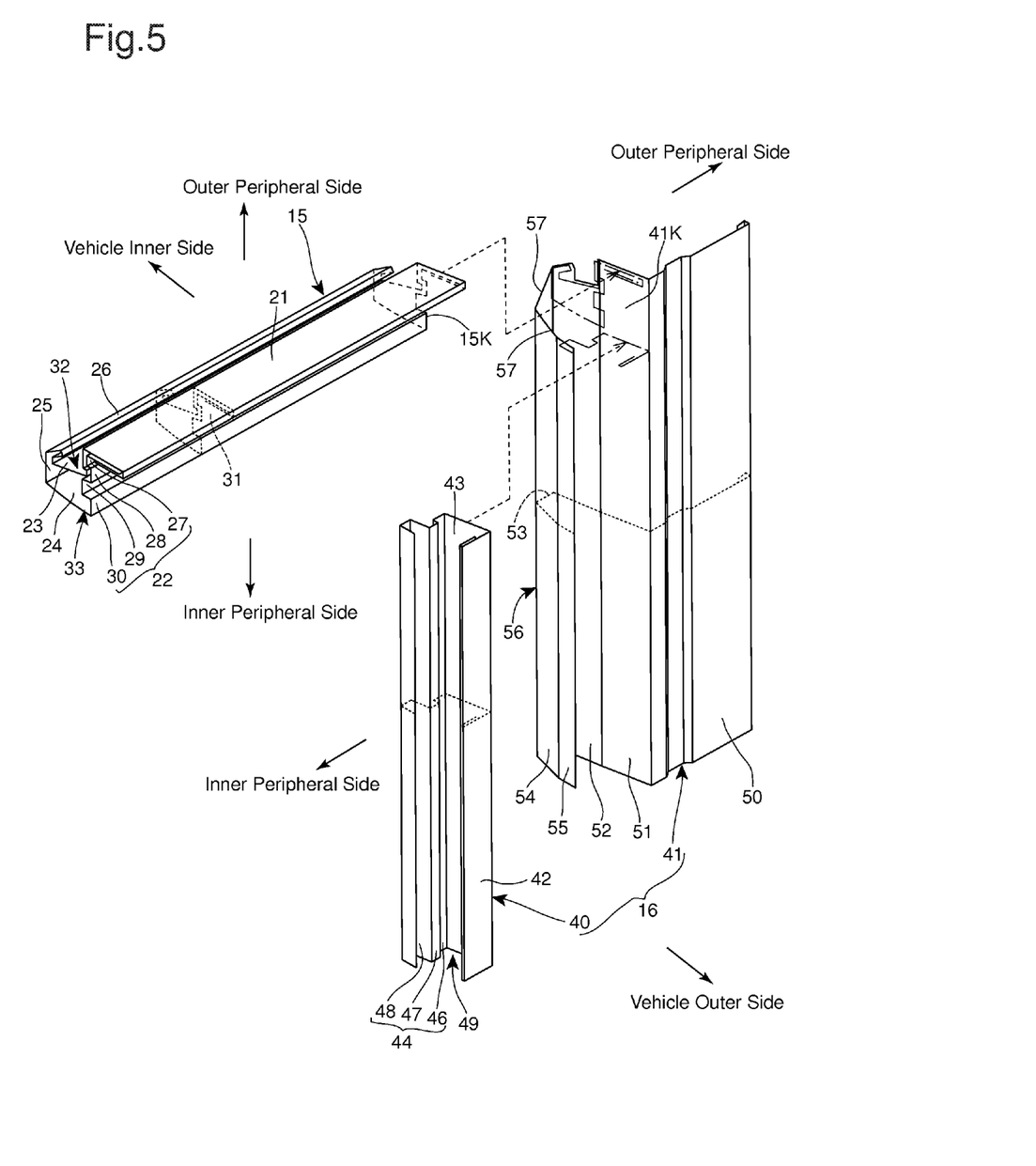
FIG. 5 is a partial exploded-perspective view of the door frame, including the door corner portion.
Figure 7:
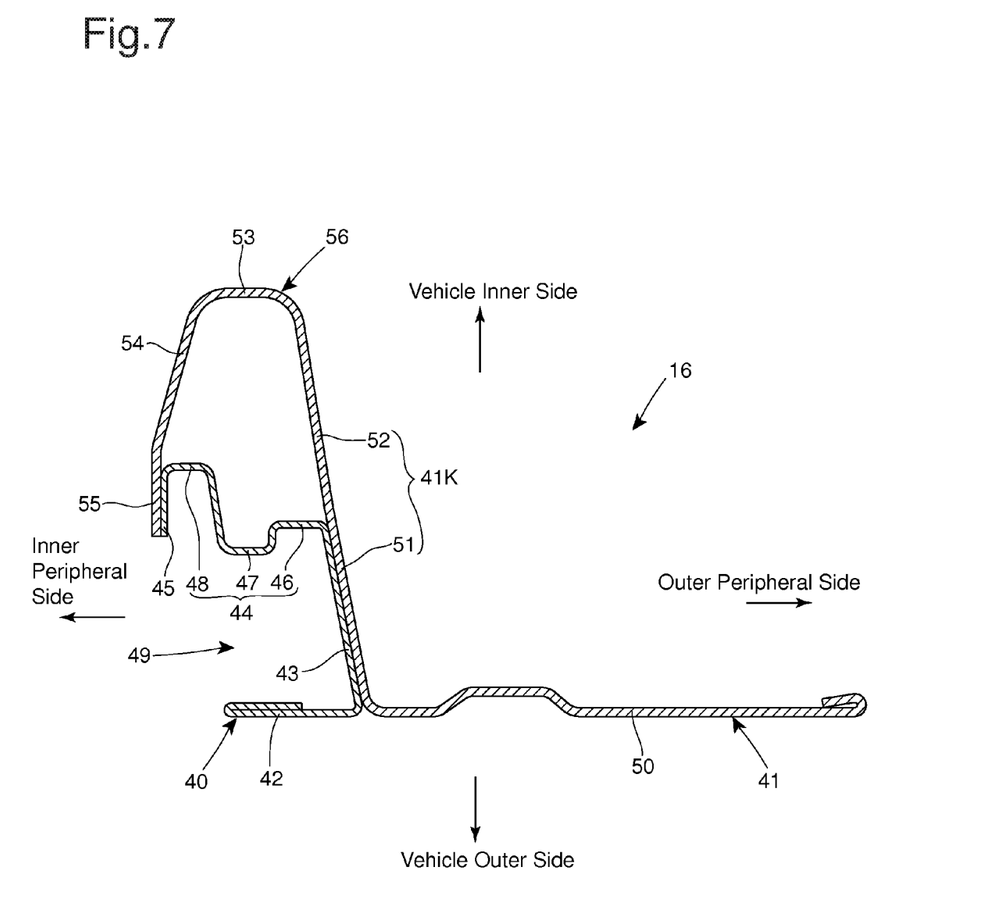
FIG. 7 is a sectional view of the upright pillar sash, taken along the line VII-VII shown in FIG. 2.

As shown in FIGS. 5 and 7, the upright pillar sash 16 is configured of a combination of a glass-run channel 40 and an outer member 41. The glass-run channel 40 is an elongated member which is formed by extrusion or roll forming sheet metal and is configured of a vehicle-outer-side wall 42 positioned on the vehicle outer side, a glass-run retainer base wall 43 extending from an outer-peripheral-side end of the vehicle-outer-side wall 42 toward the vehicle inner side, a central upright wall (vehicle-outer-side wall section) 44 extending from the glass-run retainer base wall 43 toward the inner peripheral side, and a terminal wall section 45, which is formed by bending an inner-peripheral-side end of the central upright wall 44 toward the vehicle outer side. The central upright wall 44 has a rippled profile, including a first stepped section 46 which is continuous with the glass-run retainer base wall 43 and projects toward the vehicle inner side, a second stepped section 47 which is continuous with the first stepped section 46 and projects toward the vehicle outer side, and a third stepped section 48 positioned between the second stepped section 47 and the terminal wall section 45 and projects toward the vehicle inner side, in that order from the outer peripheral side to the inner peripheral side.

The outer member 41 is an elongated member made of sheet metal which is formed by extrusion or roll forming, and is provided with a vehicle-outer-side wall 50 positioned on the vehicle outer side, a base wall (extension section) 51 extending from the inner-peripheral-side end of the vehicle-outer-side wall 50 toward the vehicle inner side, an extension (outer-peripheral-side wall section) 52 which extends from the base wall 51 toward the vehicle inner side, a vehicle-inner-side wall (vehicle-inner-side wall section) 53 which extends from the vehicle-inner-side end of the extension 52 toward the inner-peripheral side, an inclined wall (inner-peripheral-side wall section) 54 which gradually progresses toward the inner peripheral side while progressing toward the vehicle outer side from the vehicle-inner-side wall 53, and an inner peripheral wall (inner-peripheral-side wall section) 55 extending from the inclined wall 54 while bending toward the vehicle outer side. The base wall 51 and the extension 52 define a joined (flush) plane 41K that constitutes an even plane portion without having any stepped sections.

The glass-run channel 40 and the outer member 41 are mutually fixed to each other by overlapping the glass-run retainer base wall 43 with the base wall 51, overlapping the terminal wall section 45 with the inner peripheral wall 55 and welding these overlapped sections together. In this state, the vehicle-outer-side wall 42 of the glass-run channel 40 and the vehicle-outer-side wall 50 of the outer member 41 define a design portion of the upright pillar sash 16. In a completed state of the door frame 12, the vehicle-outer-side wall 42 and the outer side of the vehicle-outer-side wall 50 are covered with a garnish molding (exterior member).

The vehicle-outer-side wall 42 of the glass-run channel 40, the glass-run retainer base wall 43, the central upright wall 44, and the terminal wall section 45 of the upright pillar sash 16 define a glass-run retainer portion 49, into which a glass run is fitted and retained. The glass-run retainer portion 49 has a bottomed boxed shape which is open toward the inner peripheral side.

In a general cross-sectional part of the upright pillar sash 16, except for the corner portion A, a weather strip channel is fixed to a surface (the surface on the opposite side of the base wall 51 to which the glass-run retainer base wall 43 of the glass-run channel 40 is layered on) on the outer peripheral side of the base wall 51 of the outer member 41. Although the weather strip channel is not shown in the drawings, the vehicle-outer-side wall 50 of the glass-run retainer base wall 43, the base wall 51, the extension 52 and the weather strip channel define a weather-strip retainer portion, in which a weather strip is fitted and retained. When the door 10 is closed, part of the weather strip presses against the extension 52 and the door opening of the vehicle body (not shown) to achieve a liquid-tight state between the door 10 and the vehicle body.

In the upright pillar sash 16, the central upright wall 44 of the glass-run channel 40, the extension 52 of the outer member 41, the vehicle-inner-side wall 53, the inclined wall 54 and the inner peripheral wall 55 define a rectangular-tubular (rectangular hollow-section) main frame portion (frame body portion) 56 having a hollow section. The main frame portion 56 has a closed cross-sectional shape over the entire longitudinal length of the upright pillar sash 16, and increases the sectional strength of the upright pillar sash 16. In a state where the outer member 41 is a single member with the glass-run channel 40 removed from the upright pillar sash 16, since the central upright wall 44 of the glass-run channel 40 does not exist, the main frame portion 56 has a sectional profile which is open at the vehicle outer side.

The joining structure of the upper sash 15 and the upright pillar sash 16 at the corner portion A will be hereinafter discussed. The part of the upper sash 15 that defines the door frame 12 mostly has a uniform cross-sectional shape except for the front-end portion thereof that is inserted into the door panel 11, and a rear portion of the upper sash 15 that faces the corner portion A defines a joining end surface (longitudinal-end surface) 15K (see FIG. 5) which is orthogonal to the longitudinal direction of the upper sash 15.

Figure 2:
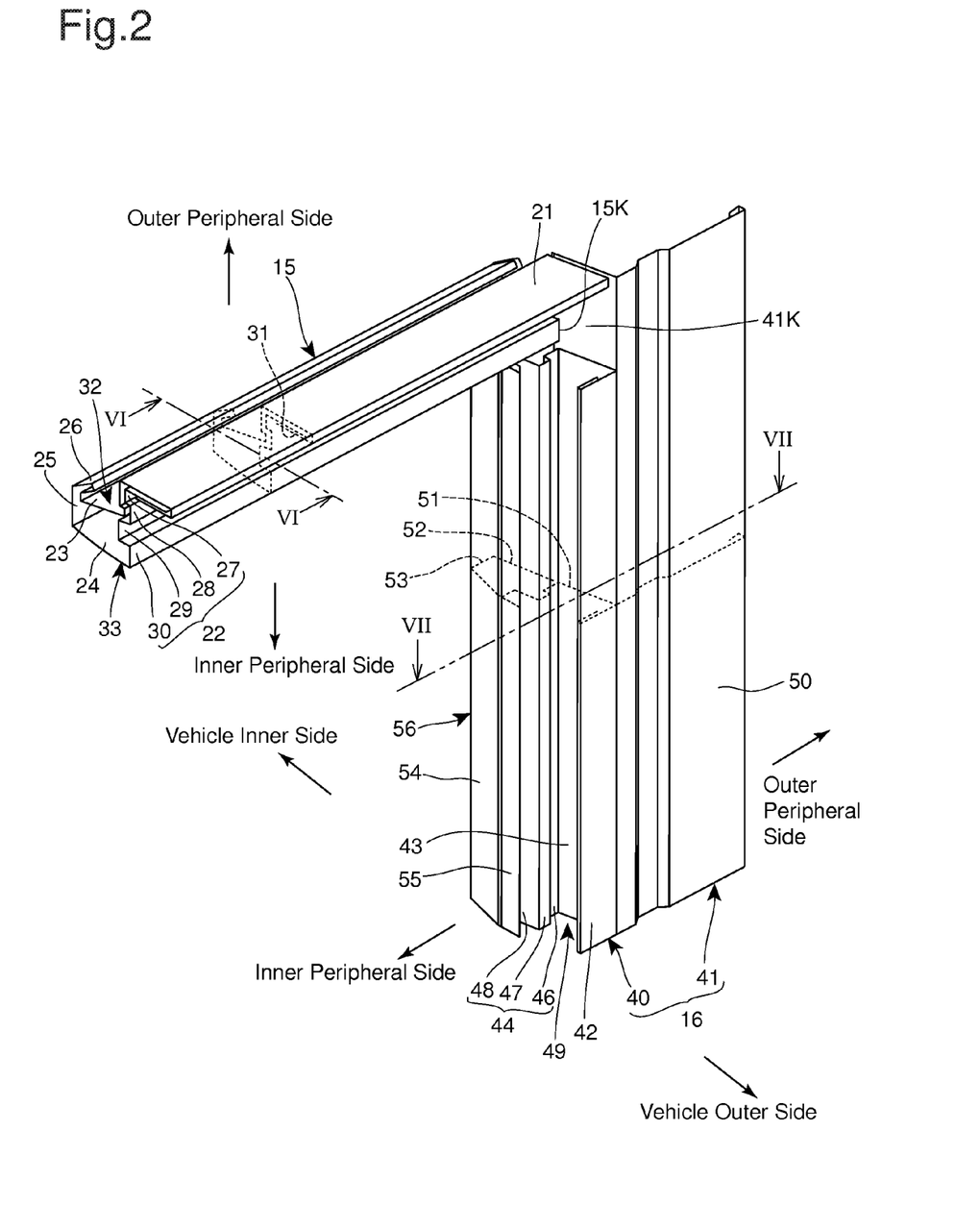
FIG. 2 is a partial perspective view of a door frame, of the door of FIG. 1, including a door corner portion at which the upper sash and the upright pillar sash are joined.

As shown in FIG. 2, in the upright pillar sash 16 at the corner portion A, the glass-run channel 40 does not fully extend to the upper end of the upright pillar sash 16; only the outer member 41 remains thereat. As shown in FIG. 5, part of the outer member 41 is also cut out at the upper end of the corner portion A to form a cut-out section (open section) 57. Specifically, the vehicle-outer-side wall 50 of the outer member 41, and the base wall 51 and the extension 52 that constitute the joined plane 41K of the outer member 41 extend up to the upper end of the corner portion A, whereas the upper end of the vehicle-inner-side wall 53 is formed as an inclined edge surface that inclines downward from the extension 52, and the upper ends of the inclined wall 54 and the inner peripheral wall 55 are formed as an inclined surface that inclines downward from the vehicle-inner-side wall 53; these inclined surfaces define the cut-out section 57. In other words, due to the cut-out section 57, the upper-end position of the wall section on the inner peripheral side of the main frame portion 56 of the upright pillar sash 16 (the inclined wall 54 and the inner peripheral wall 55) is set lower than the upper-end position of the wall section on the outer peripheral side (extension 52), and the upper end of the main frame portion 56 has a profile that is open toward the inner peripheral side. The upper end of the main frame portion 56 also has profile which is open toward the vehicle outer side due to the upper end of the main frame portion 56 not being closed up by the central upright wall 44 of the glass-run channel 40.

Upon joining the upper sash 15 and the upright pillar sash 16 together, as shown in FIG. 5, a joining end-surface 15K at the rear end of the upper sash 15 is brought close to the upper end of the upright pillar sash 16. At this stage, the cut-out section 57, which constitutes an open section that opens the main frame portion 56 of the upright pillar sash 16 toward the inner peripheral side, is positioned on an extension of the joining end-surface 15K, and the end of the upper sash 15 (the end portion of the main frame portion 33 in particular) can be inserted into the main frame portion 56 of the upright pillar sash 16 without being restricted by the inclined wall 54 and the inner peripheral wall 55. Furthermore, the joining end-surface 15K is made to face the joined plane 41K (the base wall 51 and the extension 52), and the upper sash 15 and the upright pillar sash 16 (outer member 41) are fixed to each other by welding.

Figure 3:
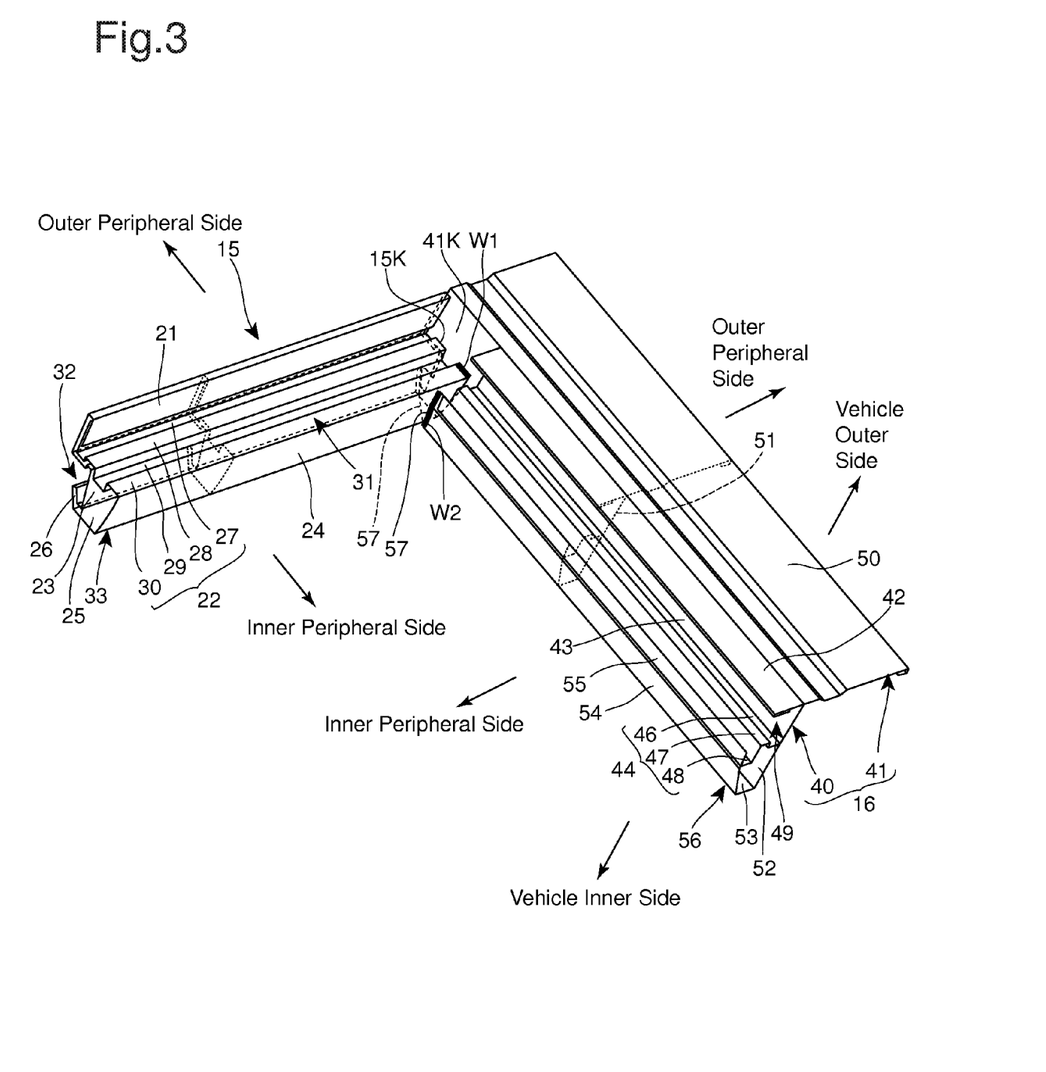
FIG. 3 is a partial perspective view of the door frame, viewed from a different angle than that shown in FIG. 2.
Figure 4:
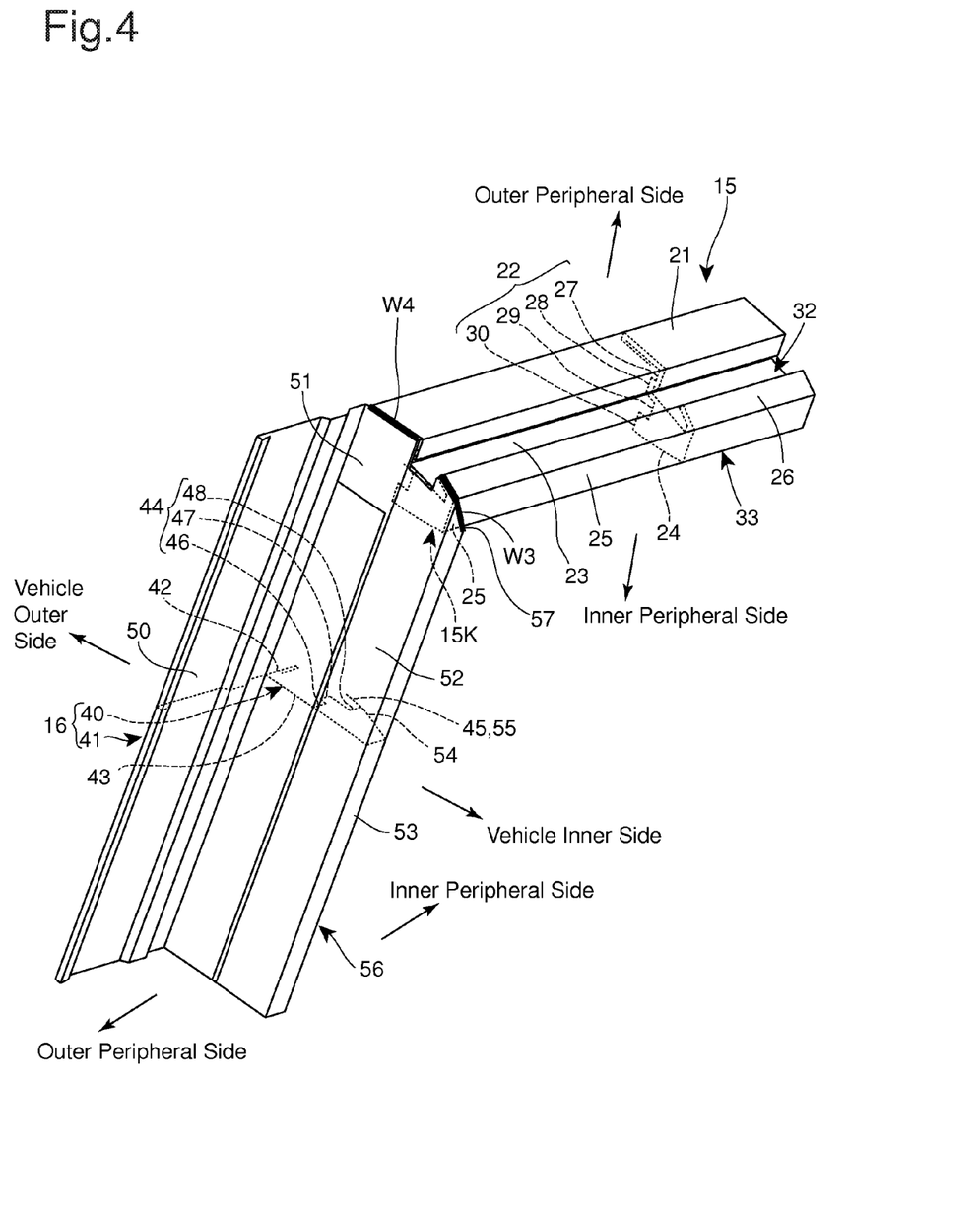
FIG. 4 is a partial perspective view of the door frame, viewed from a different angle than that shown in FIG. 2.

As shown in FIGS. 3 and 4, welding is carried out at a plurality of locations. A welding region W1, a welding region W2 and a welding region W3 are welding locations for the main frame portion 33 and the main frame portion 56 of the upper sash 15 and the upright pillar sash 16, respectively, and a welding region W4 is for a welding location other than the main frame portion 33 and the main frame portion 56.

As shown in FIG. 3, the welding region W1 is welded along a region between the fourth stepped section 30, which is part of the central wall 22 of the joining end-surface 15K of the upper sash 15 and the joined plane 41K (extension 52) of the upright pillar sash 16. The welding region W2 is welded between a region along the inclined wall 54 and the inner peripheral wall 55 of the cut-out section 57 at the upper end of the upright pillar sash 16 and along the inner peripheral wall 24 of the upper sash 15. In other words, each of the welding region W1 and the welding region W2 are welded by bringing a longitudinal end of one of the upper sash 15 and the upright pillar sash 16 (the joining end-surface 15K of the upper sash 15 and the edge portion of the cut-out section 57 of the upright pillar sash 16) against a longitudinal end of the other of the upper sash 15 and the upright pillar sash 16 (the joined plane 41K of the upright pillar sash 16 and the surface on the inner peripheral side of the inner peripheral wall 24 of the upper sash 15), so that the upper sash 15 and the upright pillar sash 16 do not have a structure in which the longitudinal end surfaces are butted against each other.

Furthermore, although it is necessary for the end portion of the main frame portion 33 of the upper sash 15 to have a profile so as to be insertable into the main frame portion 56, as a requirement for the opening that is formed in the main frame portion 56 of the upright pillar sash 16, if there is a large gap between the opening in the main frame portion 56 and the main frame portion 33, it becomes difficult to weld the welding region W2. Therefore, as illustrated in the present embodiment, it is desirable to cut out the inclined wall 54 and the inner peripheral wall 55 to form the cut-out section 57 along the inner peripheral wall 24 of the main frame portion 33 of the upper sash 15 so as to be joined at the welding region W2.

By inserting the rear end portion of the main frame portion 33 of the upper sash 15 into the main frame portion 56 of the upright pillar sash 16, the vehicle-inner-side wall 25 of the main frame portion 33 and the vehicle-inner-side wall 53 of the main frame portion 56 mutually overlap each other. As shown in FIG. 4, the region along the cut-out section 57 of the vehicle-inner-side wall 53 of the upright pillar sash 16 is welded to the vehicle-inner-side wall 25 of the upper sash 15 at the welding region W3. Furthermore, the region along the cantilever protrusion 26 of the joining end-surface 15K of the upper sash 15 faces against the extension 52 of the upright pillar sash 16, and the opposing (facing) portions of the cantilever protrusion 26 of the extension 52 are continuously welded at the welding region W3. The upper end of the extension 52 has a profile that matches the weather-strip retaining portion 32 of the upper sash 15 and can be easily welded to each other since no large step exists at the welding portion between the cantilever protrusion 26 and the extension 52.

The welding region W4 is welded between the region along the glass-run retaining base wall 21 of the joining end-surface 15K of the upper sash 15 and the upper end vicinity of the base wall 51 of the joined plane 41K of the upright pillar sash 16. As can be understood from FIGS. 2 and 5, in a state where the joining end-surface 15K is brought against the joined plane 41K, the rear end of the glass-run retaining base wall 21 is positioned slightly lower than the upper end of the base wall 51. Since the welding of the welding region W4 is carried out by filling the uneven step between the glass-run retaining base wall 21 and the base wall 51, a superior outward finish can be achieved without any welded trace externally protruding.

As discussed above, the main frame portion 33 and the main frame portion 56 have enclosed cross-sectional shapes for increasing the sectional strength of the upper sash 15 and the upright pillar sash 16, respectively, and one of which cannot be inserted into the other thereof while still having mutually enclosed cross-sectional shapes. In the corner portion A of the illustrated embodiment, the main frame portion 56 of the upright pillar sash 16 has a partial opened profile due to the cut-out section 57, and the main frame portion 33 of the upper sash 15 is inserted into (fed into) the main frame portion 56 via this opening (cut-out section 57). According to this structure, the main frame portion 33 and the main frame portion 56 are joined with each other by overlapping each other, thereby improving the strength of the corner portion A. In particular, by overlapping the vehicle-inner-side wall 25 of the main frame portion 33 with the vehicle-inner-side wall 53 of the main frame portion 56, the strength of the door frame 12 with respect to loads in the vertical direction that act on the inner and outer peripheral directions of the door frame 12 is increased. In a joining structure in which mutually opposed longitudinal-end surfaces of an upper sash and the upright pillar sash are butted against each other, it is conceivable to add an additional bracket in order to increase the strength against loads; however, in the present invention, a high load-resistance capability can be achieved using only the upper sash 15 and the upright pillar sash 16.

Furthermore, since the upper sash 15 and the upright pillar sash 16 are joined together in a manner such that the joining end-surface 15K of the upper sash 15 is inserted until a position at which the joining end-surface 15K is brought against (abuts) the joined plane 41K, which extends in the longitudinal direction of the upright pillar sash 16, a strictly accurate positioning of these joining surfaces is not required as much as in the case of butting longitudinal-end surfaces of each sash in the aforementioned structure of the related art, and hence, the precision control at the joining locations can be easily achieved. Furthermore, the relative positional relationship in the forward/rearward direction of the upper sash 15 and the upright pillar sash 16 can be easily and securely determined by the abutting relationship between the joining end-surface 15K and the joined plane 41K.

As described above, according to the door frame 12 of the illustrated embodiment of the present invention, the upper sash 15 and the upright pillar sash 16 can be joined together at the corner portion A with high strength, and the precision control at the corner portion A is easily achieved.

Although the present invention has been described based on the above illustrated embodiments, the present invention is not limited solely to these particular embodiments; various modifications to the above illustrated embodiments is possible without departing the spirit and scope of the present invention. For instance, in the illustrated embodiment, the cut-out section 57 for providing an opening in the main frame portion 56 of the upright pillar sash 16 is formed from the vehicle-inner-side wall 53, the inclined wall 54 and the inner peripheral wall 55; however, since it is possible to insert the main frame portion 33 into the main frame portion 56 so long as at least the inclined wall 54 and the inner peripheral wall 55, which face the joining end-surface 15K of the upper sash 15, are cut out, an embodiment is possible in which the vehicle-inner-side wall 53 is not cut out.

Furthermore, in the illustrated embodiment the upright pillar sash 16 is formed from a combination of the glass-run channel 40 and the outer member 41, however, the present invention can also be applied to a door frame having an upright pillar sash that is formed as a single member configured of portions that correspond to the glass-run channel 40 and the outer member 41.

Furthermore, in the illustrated embodiment, a structure is disclosed in which the cut-out section 57 is formed in the upright pillar sash 16 so that part of the main frame portion 56 is open, and an end of the upper sash 15 inserted into the main frame portion 56; however, it is possible to reverse the insertion and insertion-receiving relationship to so that an opening corresponding to the cut-out section 57 is formed in the main frame portion 33 of the upper sash 15, and an end of the upright pillar sash 16 is inserted into the main frame portion 33. In other words, the present invention is achievable so long as one of the upper sash and the upright pillar sash is an insertion-receiving sash having an opening (cut-out section), and the other of the upper sash and the upright pillar sash is an insertion sash which is inserted into the frame body portion through the opening.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A door frame structure of a vehicle door comprising an upright pillar sash that extends in a substantially vertical direction and an upper sash that forms an upper edge of said vehicle door, wherein said upright pillar sash and said upper sash are joined together at a corner portion, wherein each of said upright pillar sash and said upper sash includes a frame body portion extending in a longitudinal direction thereof, said frame body portion including a vehicle-inner-side wall section and a vehicle-outer-side wall section which are separate from each other in a direction toward the vehicle inner side/vehicle outer side, and an inner-peripheral-side wall section and an outer-peripheral-side wall section which connect the vehicle-inner-side wall section and the vehicle-outer-side wall section to each other and are separate from each other in a direction toward the inner peripheral side/outer peripheral side of the door frame, wherein said vehicle-inner-side wall section, said inner-peripheral-side wall section, said vehicle-outer-side wall section and said outer-peripheral-side wall section form a tubular enclosed cross-sectional shape, wherein an opening is formed in part of said frame body portion of one of said upright pillar sash and said upper sash at said corner portion, and said frame body portion of the other of said upright pillar sash and said upper sash is inserted into said frame body portion, of said one of said upright pillar sash and said upper sash, through said opening thereof, wherein a longitudinal-end surface of said other of said upright pillar sash and said upper sash that is inserted into said opening is brought proximate to an inner surface of said frame body portion that extends in the longitudinal direction of said one of said upright pillar sash and said upper sash in which said opening is formed, wherein at least part of an insertion part of said other of said upright pillar sash and said upper sash that is inserted into said opening is fixed and welded to said one of said upright pillar sash and said upper sash, and wherein the longitudinal-end surface includes a region having a portion of a cantilever protrusion brought proximate to an extension of the inner surface such that the portion of the cantilever protrusion is welded to the extension of the inner surface.

2. The door frame structure according to claim 1, wherein, at said corner portion, part of said inner-peripheral-side wall section of said frame body portion of said one of said upright pillar sash is cut out to form said opening, and a longitudinal-end surface of said frame body portion of said other of said upright pillar sash and said upper sash is inserted until being brought proximate to an inner surface of said outer-peripheral-side wall section of said frame body portion of said one of said upright pillar sash and said upper sash, and wherein a region along said vehicle-outer-side wall section of said longitudinal-end surface of said other of said upright pillar sash and said upper sash is brought proximate and welded to said outer-peripheral-side wall section of said one of said upright pillar sash and said upper sash.

3. The door frame structure according to claim 1, wherein, at said corner portion, a region along said opening of said inner-peripheral-side wall section of said one of said upright pillar sash and said upper sash is brought proximate and welded to said inner-peripheral-side wall section of said other of said upright pillar sash and said upper sash.

4. The door frame structure according to claim 1, wherein, at said corner portion, said vehicle-inner-side wall section of said other of said upright pillar sash and said upper sash and said vehicle-inner-side wall section of said one of said upright pillar sash and said upper sash are mutually overlapped and are welded to each other at overlapping regions thereof.

5. The door frame structure according to claim 1, wherein each of the one and the other of said upright pillar sash and said upper sash comprises an extension section which extends from an associated said frame body portion toward the vehicle outer side, and wherein a region along said extension section of the longitudinal-end surface of said other of said upright pillar sash and said upper sash is welded to said extension section of said one of said upright pillar sash and said upper sash.

6. A door frame structure of a vehicle door comprising an upright pillar sash that extends in a substantially vertical direction and an upper sash that forms an upper edge of said vehicle door, wherein said upright pillar sash and said upper sash are joined together at a corner portion, wherein each of said upright pillar sash and said upper sash includes a frame body portion extending in a longitudinal direction thereof, said frame body portion including a vehicle-inner-side wall section and a vehicle-outer-side wall section which are separate from each other in a direction toward the vehicle inner side/vehicle outer side, and an inner-peripheral-side wall section and an outer-peripheral-side wall section which connect the vehicle-inner-side wall section and the vehicle-outer-side wall section to each other and are separate from each other in a direction toward the inner peripheral side/outer peripheral side of the door frame, wherein said vehicle-inner-side wall section, said inner-peripheral-side wall section, said vehicle-outer-side wall section and said outer-peripheral-side wall section form a tubular enclosed cross-sectional shape, wherein an opening is formed in part of said frame body portion of one of said upright pillar sash and said upper sash at said corner portion, and said frame body portion of the other of said upright pillar sash and said upper sash is inserted into said frame body portion, of said one of said upright pillar sash and said upper sash, through said opening thereof, wherein a longitudinal-end surface of said other of said upright pillar sash and said upper sash that is inserted into said opening is brought proximate to an inner surface of said frame body portion that extends in the longitudinal direction of said one of said upright pillar sash and said upper sash in which said opening is formed, wherein at least part of an insertion part of said other of said upright pillar sash and said upper sash that is inserted into said opening is fixed and welded to said one of said upright pillar sash and said upper sash, and wherein the longitudinal-end surface includes an end of a glass-run retaining base wall positioned slightly lower than an upper end of the inner surface.

* * * * *